US005493013A

United States Patent [19]
Reichel

[11] Patent Number: 5,493,013
[45] Date of Patent: Feb. 20, 1996

[54] PROCESS FOR PREPARING CELLULOSE ETHERS WITH CYCLIC ETHERS AS SUSPENDING AGENTS

[75] Inventor: Diethart Reichel, Darmstadt, Germany

[73] Assignee: Hoechst Aktiengesellschaft, Germany

[21] Appl. No.: 252,386

[22] Filed: Jun. 1, 1994

Related U.S. Application Data

[63] Continuation-in-part of Ser. No. 50,583, Apr. 21, 1993, abandoned.

[30] Foreign Application Priority Data

Apr. 23, 1992 [DE] Germany ............... 42 13 329.7

[51] Int. Cl.$^6$ ............... C08B 11/02; C08B 11/193
[52] U.S. Cl. ............... 536/84; 536/91
[58] Field of Search ............... 536/84, 90, 91, 536/95

[56] References Cited

U.S. PATENT DOCUMENTS

| | | | |
|---|---|---|---|
| 2,190,451 | 2/1940 | Haskins | 536/84 |
| 2,265,913 | 12/1941 | Lilienfeld et al. | 536/91 |
| 2,618,632 | 11/1952 | Klug | 536/91 |
| 3,278,520 | 10/1966 | Klug | 536/95 |
| 3,278,521 | 10/1966 | Klug | 536/95 |
| 3,314,809 | 4/1967 | Klug | 106/197.1 |
| 3,652,539 | 3/1972 | Miura et al. | 536/85 |
| 4,084,060 | 4/1978 | Glass, Jr. et al. | 536/96 |
| 4,096,325 | 6/1978 | Teng | 536/91 |
| 4,339,574 | 7/1982 | Wüst et al. | 536/99 |
| 4,415,683 | 11/1983 | Kernstock | 524/43 |
| 4,460,766 | 7/1984 | Felcht et al. | 536/98 |
| 4,650,863 | 3/1987 | Felcht et al. | 536/91 |
| 4,904,772 | 2/1990 | Sau | 536/91 |
| 5,166,333 | 11/1992 | Breckwoldt | 536/90 |
| 5,244,945 | 9/1993 | Elion | 524/10 |

FOREIGN PATENT DOCUMENTS

| | | |
|---|---|---|
| 2929011 | 2/1981 | Germany . |
| 1468017 | 10/1981 | Germany . |

OTHER PUBLICATIONS

Derwent Abstract of JP 01165601, Toho Chemical Ind. Ltd., Jun. 29, 1989.

*Primary Examiner*—Jeffrey Mullis

[57] ABSTRACT

Process for preparing cellulose ethers with cyclic ethers as suspending agents. The present invention relates to a process for preparing cellulose ethers from cellulose and alkylating agents, in the presence of water and bases and at least one water-miscible cyclic ether as the suspending agent, comprising the stages:

a) alkalisation,
b) subsequent alkylation, wherein the water-miscible cyclic ether is employed already in stage a) or, where appropriate, not until stage b).

18 Claims, No Drawings

PROCESS FOR PREPARING CELLULOSE ETHERS WITH CYCLIC ETHERS AS SUSPENDING AGENTS

This application is a continuation of application Ser. No. 08/050,583, filed Apr. 21, 1993, now abandoned.

The preparation of cellulose ethers with the same or different types of ether substituents is known (see e.g. Ullmann's Encyklopädie der Technischen Chemie (Encyclopedia of Industrial Chemistry), vol. 9, "Cellulose ethers", Verlag Chemie, Weinheim, 4th edition 1975, pp. 192 ff.). Most of the known processes for preparing cellulose ethers are carried out in two stages, with the preparation of the "alkali cellulose" taking place first followed by the etherification of this "alkali cellulose". To prepare the "alkali cellulose", cellulose is mixed as homogeneously as possible with water and alkali metal hydroxides in suitable industrial units. The etherification stage is generally carried out by reacting the alkali cellulose produced in the first stage together with the etherifying agent, which has meanwhile been added, with efforts being made to achieve as uniform an etherification as possible and high substitution yields.

A process is known from U.S. Pat. No. 4,460,766 for preparing cellulose ethers using dimethoxyethane as the dispersing agent.

From U.S. Pat. No. 2,618,632, the use of solvents, such as dioxane and tetrahydrofuran, is known for preparing carboxymethylhydroxyethyl cellulose ethers.

A process is known from DE-OS-29 29 011 for the continuous preparation of alkyl cellulose using an agitator vessel cascade, in which the alkali cellulose is first prepared by reacting cellulose with aqueous-alcoholic sodium hydroxide solution, where appropriate in the presence of aromatic substances or cyclic ethers, and then alkylation subsequently takes place. In this process, a portion of the water/alcohol mixture which is present is distilled off after the formation of the alkali cellulose in order to increase the degree of substitution of the cellulose ether to be prepared. A process is known from DE-C-14 68 017 for preparing hydroxypropyl celluloses in which the excess liquid, which is composed of a mixture of water and inert organic diluent, such as dioxane, acetone or methyl ethyl ketone, must to a large extent be removed in order to achieve the highest possible degrees of substitution prior to the etherification.

A process is known from JP-OS-01/165 601 for preparing hydroxyethyl cellulose, in which the alkali cellulose is first prepared by reacting the cellulose with an aqueous-alkaline solution, the alkali cellulose is subsequently dispersed in a mixture of dioxane and water and the reaction then takes place with ethylene oxide.

It was the object of the present invention to improve the known processes for preparing cellulose ethers using cyclic ethers as suspending agents in order to obtain products with a high etherification yield, uniform distribution of the substituents and resistance to oxidative degradation.

The invention relates to a process for preparing cellulose ethers from cellulose and alkylating agents, in the presence of water and bases and at least one water-miscible cyclic ether as the suspending agent, comprising the stages:

a) alkalisation, b) subsequent alkylation, wherein the water-miscible cyclic ether is employed already in stage a) or, where appropriate, not until stage b).

The cellulose which is employed is either cotton linters or chemical wood pulp, or is present in regenerated form as cellulose hydrate. Before the beginning of the reaction, the particle size should if at all possible be smaller than 2.5 mm, in particular smaller than 1 mm, this particle size being achieved, for example, by grinding the cellulose, which is supplied in the form of relatively long fibers, to "powders".

The water-miscible, cyclic ethers which are preferably employed are dioxane and/or tetrahydrofuran. The ethers are employed as single substances or as mixtures, with the quantity of ether employed depending on the quantity of cellulose employed and being in the range of 2 to 30 parts by weight, preferably 2 to 18, particularly preferably 2 to 9, parts by weight of ether per one part by weight of cellulose.

The bases are preferably employed as alkali metal hydroxide—particularly preferred NaOH—in solid form or in dissolved form as alkali metal hydroxide solution, it being possible also to employ ammonium bases. When alkali metal hydroxides are employed as bases, the proportion is in general 0.6 to 8.0 mol, in particular 0.8 to 6.0 mol, per mol of cellulose (calculated as anhydroglucose $C_6H_{10}O_5$). The proportion of water in the reaction mixture is expediently chosen so that it is in the range of 3 to 20 mol per mol of cellulose, or, if the liquid mixture of cyclic ethers/water is to serve as the reference size, the proportion of the water in the mixture is then 3 to 40 % by weight.

Agents for the hydroxyalkylation which are preferably employed are alkylene oxides of $C_2$ to $C_4$, such as ethylene oxide and/or propylene oxide. However, 1,2-epoxybutane, acrylonitrile or 2,3-epoxypropyltrimethylammonium chloride may also be employed.

Alkylating agents which are preferably employed are alkyl chlorides of $C_1$ to $C_3$ and/or chlorocarboxylic acids of $C_2$ to $C_4$ and their alkali metal salts, in particular chloromethane, chloroethane and monochloroacetic acid. However, other suitable alkylating agents, such as N-(2-chloroethyl)diethylamine or 3-chloropropionic acid, chloroethanesulfonic acid, vinylsulfonic acid, chloromethanephosphonic acid and their alkali metal salts may also be employed.

In the practical implementation of the process, the cellulose is expediently first of all alkalised in a mixture of water-miscible cyclic ether, water and alkali metal hydroxide, after which addition of the agent for the hydroxyalkylation takes place in one or more stages, depending on the nature of these agents. An alkalisation in the absence of the water-miscible cyclic ether is also possible, with addition of the latter then only taking place during the subsequent alkylation or during the hydroxyalkylation. The sequence in which the different reagents are reacted during the alkalisation is arbitrary. For example, a part or all of the water and/or a part or all of the alkali can be introduced into the water-miscible cyclic ether (suspending agent) prior to mixing with the cellulose. The cellulose can also be mixed with the suspending agent, after which the alkali and water can either be added separately or as a mixture. A part or all of the water can also be mixed with the suspending agent before mixing with the cellulose, after which the alkali and, where appropriate, the remainder of the water can then be added, either mixed or separately in arbitrary sequence. Furthermore the water can be added to the cellulose before mixing with the suspending agent. The alkali metal hydroxide can be added in solid form or as an aqueous solution. If the addition takes place in the solid form, adequate time is required to dissolve the alkali metal hydroxide in the quantity of water employed.

It is preferred to suspend the cellulose in the suspending agent and subsequently add aqueous alkali metal hydroxide solution.

The duration and temperature range of the alkalisation can vary widely. Preferably, the alkalisation is carried out at between 0° C. and 100° C. and for between 5 min and 3 h.

Where appropriate, the alkalisation is followed by the hydroxyalkylation of the alkali cellulose and following this an alkylation takes place.

In the hydroxyalkylation which optionally takes place, the reaction proceeds particularly successfully at temperatures between 20° and 150° C. in a time period of 15 min to 16 h. Preferably, the hydroxyalkylation should be carried out at a temperature of 60° to 120° C. in a time period of 30 min to 6 h. The alkylene oxide/cellulose ratio is between 0.2 and 10, particularly preferably between 0.5 and 5, mol per mol of cellulose.

Subsequent to the hydroxyalkylation, an alkylation takes place. In this stage of the process the alkylating agents, in each case depending on the nature of the substitution required, are added. It has emerged that the alkylation takes place particularly well at temperatures between 20° and 150° C. over a time period of 15minutes to 16 hours. Preferably, the alkylation should be carried out at temperatures between 60° and 120° C. over a time period of 30 minutes to 6 hours. The quantity of the alkylating agent added depends on the desired degree of substitution of the cellulose ether and is usually in the range of 0.05 to 20, preferably between 0.10 and 10, mol per mol of cellulose.

Where appropriate, a part of the water contained in the reaction mixture can be removed after the alkalisation a) but before the alkylation b). The removal is effected by the customary procedures such as pressing off or decanting off, preferably distilling off. A substantial part of the suspending agent is thereby also removed. The quantity of suspending agent/water mixture to be distilled off is in the range of up to 70% by weight, preferably 20 to 60% by weight, of the suspending agent/water mixture employed.

The process according to the invention can be carried out discontinuously or continuously in one of the units known in cellulose ether technology (e.g. kneader, agitator vessel or impeller mixer). If the temperature selected for the reaction is such that it is above the boiling temperature of the suspending agent/water mixture, the process according to the invention must be carried out in a pressure apparatus. A pressure apparatus is also normally used when employing reaction components which are gaseous even under normal conditions (1013 mbar, 20° C.) (e.g. when employing ethylene oxide or chloromethane as the etherifying agent).

After the alkylation is complete, all the volatile components are distilled off. The crude product thus obtained is treated with hot water in a suitable separating device (e.g. centrifuge or decanter), where appropriate after the addition of acid to neutralize any base which has still not been used, and can in this way be freed of any salts still adhering to it.

Subsequently, the product is dried and can, where appropriate, be ground, mixed with further components, or else granulated. These processing, purification and after-treatment methods are those which are customary in cellulose ether technology and do not therefore require any detailed description.

The cellulose ethers prepared by the process according to the invention can be employed in known areas of technology, for example as additives in the building material sector, auxiliary agents for polymerization and additives for ceramic pastes.

The advantages of the process according to the invention may be summarized as follows:

higher yields from the etherifying agents employed and thus greater cost effectiveness preparation of uniformly etherified cellulose ethers preparation of cellulose ethers with increased stability towards enzymatic degradation.

General example for the preparation of a methylhydroxypropyl cellulose (MHPC)

A 50 l reaction mixture is gradually loaded with 3.0 kg of cellulose, 900 g of water and 15.0 kg of suspending agent. While mixing and after deactivation with nitrogen, 1.45 kg of 49.5% strength by weight sodium hydroxide solution are added. After 20 min, x g of propylene oxide are added, the temperature is raised from 20° C. to 90° C., and after a stationary phase of a further 2 h, y kg of 49.5% strength by weight sodium hydroxide solution are added. Subsequently, about 9 l of suspending agent/water mixture are distilled off and after that z kg of chloromethane are added at a temperature of about 60° C. After heating to 100° C. the reaction mixture is kept at this temperature for about 1 h. After that all the volatile components are distilled off. The crude product is treated with hot water, where appropriate neutralized with hydrochloric acid, filtered off with suction and dried.

| Suspending agents: 1,4-dioxane or dimethoxyethane (DMG) | | | |
| --- | --- | --- | --- |
| Example | x (g) | y (kg) | z (kg) |
| A | 313 | 2.69 | 2.59 |
| B | 261 | 2.03 | 2.18 |
| C | 417 | 4.36 | 3.63 |

Determination of the substitution and the uniformity of the etherification.

In cellulose ether chemistry the alkyl substitution is described generally by the "DS".

The "DS" is the average number of substituted OH groups per unit of anhydroglucose.

Usually the hydroxyalkyl substitution is described by the "MS". The "MS" is the average number of moles of the etherifying reagent which are bound in an ether-like manner per mol of anhydroglucose unit.

Determination of the side groups is effected using the Zeisel method (ref.: G. Bartelmus and R. Ketterer, Z. Anal. Chem. 286 (1977) 161–190).

Cellulose is subject to enzymatic degradation by so-called cellulase. As a result of substitution, the cellulose derivative becomes more stable towards enzymatic attack, with the stability increasing as the degree of substitution increases.

Since the viscosity of a solution of a cellulose ether depends on the molecular weight of the latter, enzyme stability can be determined by measuring the viscosity.

The degradation quotient DQ is defined as the ratio of the viscosity of a cellulose ether solution after and before cellulase treatment:

$$DQ = \frac{\log \text{viscosity after cellulase treatment}}{\log \text{viscosity before cellulase treatment}}$$

Since the enzyme stability increases as the degree of substitution rises, the quotient DQ/DS is a meaningful parameter for comparing cellulose ethers as long as the degradation quotient DQ does not reach the maximum value of 1, i.e. no enzymatic degradation is possible. Higher DQ/DS values indicate more uniform, and low DQ/DS values less uniform, etherification and alkalisation.

TABLE 1

| Suspending agent | DS | MS | Yield % Chloromethane | Yield % Propylene oxide | DQ/DS |
| --- | --- | --- | --- | --- | --- |
| Example A: | | | | | |
| 1,4-Dioxane | 1.61 | 0.17 | 56.3 | 57.0 | 0.44 |
| DMG (*) | 1.56 | 0.15 | 54.8 | 50.9 | 0.36 |
| Example B: | | | | | |
| 1,4-Dioxane | 1.50 | 0.14 | 62.7 | 56.7 | 0.45 |
| DMG (*) | 1.47 | 0.13 | 61.1 | 52.5 | 0.37 |
| Example C: | | | | | |
| 1,4-Dioxane | 1.76 | 0.24 | 44.0 | 59.6 | 0.49 |
| DMG (*) | 1.76 | 0.22 | 43.9 | 55.0 | 0.40 |

(*): Comparison examples

I claim:

1. A process for preparing cellulose ethers from cellulose and alkylating agents, in the presence of a base and water and a water miscible cyclic ether as a suspending agent consisting essentially of dioxane and/or THF comprising the stages:

a) alkalization, b) subsequent alkylation, and optionally stage c) hydroxyalkylation which would be performed between stages a) and b);

wherein the water-miscible cyclic ether is admixed in 1) stage a) or, 2) if optional stage c) is performed then in stage a) or stage c), and wherein after stage a) and before stage b) a part of the water-miscible cyclic ether together with a part of the water are removed by distillation.

2. The process as claimed in claim 1, wherein a hydroxyalkylation c) takes place after stage a) and before stage b) and, optionally, the water-miscible, cyclic ether is admixed during stage c).

3. The process as claimed in claim 4, wherein up to 70% by weight of the suspending agent/water mixture admixed is removed.

4. The process as claimed in claim 1, wherein the alkalisation is carried out at between 0° C. and 100° C. and for between 5 minutes and 3 hours and the alkylation is carried out at a temperature between 20° and 150° C. over a time period of 15 minutes to 16 hours.

5. The process as claimed in claim 1, wherein after stage a), but before stage b), up to 70% by weight of the suspending agent/water mixture admixed is removed.

6. The process as claimed in claim 5, wherein 20–60% by weight of the suspending agent/water mixture admixed is removed.

7. The process as claimed in claim 1, wherein after stage c), up to 70% by weight of the suspending agent/water mixture admixed is removed.

8. The process as claimed in claim 7, wherein 20–60% by weight of the suspending agent/water mixture admixed is removed.

9. The process as claimed in claim 1, wherein the cellulose is cotton linters, chemical wood pulp or is present in a regenerated form as cellulose hydrate.

10. The process as claimed in claim 9, wherein the cellulose has a particle size less than 2.5 mm.

11. The process as claimed in claim 1, wherein the hydroxyalkylation is carried out at a temperature between 20° and 150° C. in a time period of 15 minutes to 16 hours.

12. The process as claimed in claim 4, wherein the hydroxyalkylation is carrier out at a temperature of 60° to 120° C. in a time period of 30 minutes to 6 hours.

13. The process as claimed in claim 12, wherein the alkylation is carried out at a temperature range between 60° and 120° C. over a time period of 30 minutes to 6 hours.

14. The process as claimed in claim 13, wherein the quantity of alkylating agent added is in the range of 0.1 to 10 mols per cellulose; the bases are present in an amount of 0.6 to 8.0 mols per mol of cellulose; the water is in the range of 3 to 20 mols per mol of cellulose; and hydroxyalkylation agent is alkylene oxide and said alkylene oxide is present in an amount from 0.5 to 5 mol per mol of cellulose.

15. The process as claimed in claim 1, wherein 2 to 30 parts by weight of water-miscible cyclic ethers are admixed per one part by weight of cellulose.

16. The process as claimed in claim 15, wherein 2 to 18 parts by weight of water-miscible cyclic ethers are admixed per one part by weight of cellulose.

17. The process as claimed in claim 15, wherein 2 to 9 parts by weight of water-miscible cyclic ethers are admixed per one part by weight of cellulose.

18. The process as claimed in claim 17, wherein 20 to 60% by weight of the suspending agent/water mixture admixed is removed.

* * * * *